United States Patent [19]

Thomas et al.

[11] Patent Number: 4,788,681
[45] Date of Patent: Nov. 29, 1988

[54] DIGITAL TRANSMISSION SYSTEM

[75] Inventors: Anthony R. Thomas, Hinckley; Stephen P. Ferguson, Earlsdon, both of England

[73] Assignee: The General Electric company, p.l.c., England

[21] Appl. No.: 37,929

[22] Filed: Apr. 13, 1987

[30] Foreign Application Priority Data

Apr. 18, 1986 [GB] United Kingdom ............... 8609499

[51] Int. Cl.$^4$ .............................................. H04J 3/06
[52] U.S. Cl. .................................... 370/100; 375/114
[58] Field of Search ................. 370/100; 375/114, 116

[56] References Cited

U.S. PATENT DOCUMENTS

| | | | |
|---|---|---|---|
| 3,985,967 | 10/1976 | Colton et al. | 370/100 |
| 4,594,708 | 6/1986 | Servel et al. | 370/100 |
| 4,596,981 | 6/1986 | Ueno et al. | 370/100 |
| 4,602,369 | 7/1986 | McDermott, III | 375/114 |
| 4,651,319 | 3/1987 | Bowlds | 370/100 |
| 4,674,088 | 6/1987 | Grover | 375/116 |
| 4,698,806 | 10/1987 | Graves et al. | 370/100 |

Primary Examiner—Douglas W. Olms
Assistant Examiner—Min Jung
Attorney, Agent, or Firm—Kirschstein, Kirschstein, Ottinger & Israel

[57] ABSTRACT

A terminal for a telephone system and for receiving digital data in the form of a time multiplexed (TDM) data stream incorporating frames appearing at a predetermined frame period and each frame incorporating a frame word. The terminal comprises a frame word detecting circuit (52) for detecting frame words; an alignment detecting circuit (53, 55, 56) for determining whether a received TDM data stream is in alignment or not; a search circuit (53, 55, 56, 57, 59, 60) for initiating a bit-by-bit search of the incoming data stream for the sequence of bits forming the frame word when an "out-of-alignment" condition has been detected by the said alignment detecting circuit; and a delay circuit (58) for delaying the start of the bit-by-bit search after an "out-of-alignment" condition has been detected.

8 Claims, 3 Drawing Sheets

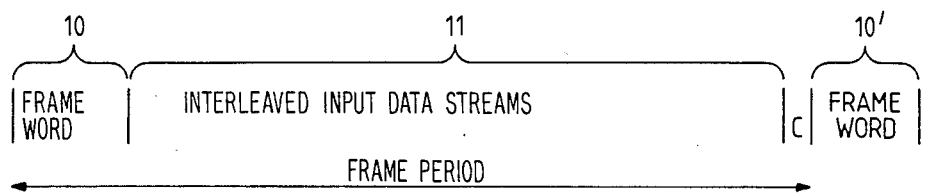
*Fig. 1(a)*
PRIOR ART
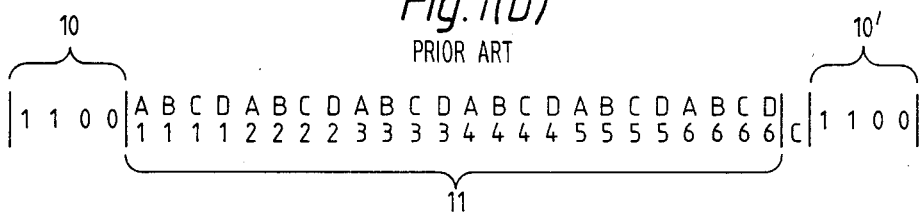
*Fig. 1(b)*
PRIOR ART
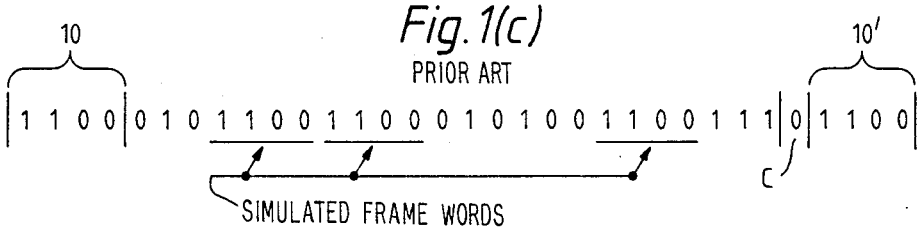
*Fig. 1(c)*
PRIOR ART
*Fig. 2.*
PRIOR ART

DIGITAL TRANSMISSION SYSTEM

BACKGROUND OF THE INVENTION

1. Field of the Invention

The present invention concerns digital transmission systems, and in particular the transmission of data by Time Division Multiplex (TDM). In TDM multiplex several data streams are combined into a single stream for more economical transmission. The combining of the data streams is carried out by a multiplexer.

2. Description of Related Art

The basic format for transmitting multiplexed digital data is commonly known as a frame. Essentially a frame is a fixed-length group of bits comprised of a specified series of digits known as a Frame Alignment Word together with data bits and other control bits. This specified series is repeated at intervals which define the frame length. The Frame Alignment Word enables a demultiplexer to align itself to the data stream. Since the multiplexer assembles the bits from its inputs in a known order, for example by bit interleaving, alignment at the demultiplexer permits correct reconstruction of the input or tributary signals. The series of bits which form the Frame Alignment Word need not be consecutive within a single frame. Thus a Frame Alignment Word can be either bunched (consecutive bits) or distributed within a frame or even a combination of the two. Generally a bunched word gives more rapid alignment. A potential source of error in the reception of TDM data is that the receiving equipment becomes out of step with the received data. This condition is known as loss of alignment.

The ability to regain alignment quickly on a data stream containing an alignment word or words is an important criterion in many digital systems.

SUMMARY OF THE INVENTION

The present invention has for an object to provide a frame alignment system for TDM digital transmission which has improved alignment performance.

Accordingly the present invention consists in a terminal for receiving digital data in the form of a time division multiplexed data stream incorporating frames appearing at a predetermined frame period and each incorporating a frame word, the terminal including means for detecting frame words, means for determining whether a received data stream is in alignment or not, means for initiating a bit-by-bit search of the incoming data stream for the sequence of bits forming the frame word when an "out-of-alignment" condition has been detected, and means for delaying the start of the bit-by-bit search after an out-of-alignment condition has been detected.

Preferably the delay period has a maximum length of one-frame period minus one bit.

Brief Description of the Drawings

In order that the present invention may be more readily understood an embodiment thereof will now be described by way of example and with reference to the accompanying drawings in which:

FIGS. 1(a) 1(b) and 1(c) show some typical data sequences in TDM data transmission, FIG. 2 shows a sequence which is followed when an out-of-alignment condition is detected.

Detailed Description of the Preferred Embodiments

Referring now to the accompanying drawings FIG. 1(a) shows a generalised data sequence of the kind which occurs in transmission of digital data by Time Division Multiplex (TDM). As previously mentioned the basic unit of such a stream of data is the frame and FIG. 1(a) shows one such complete frame. Essentially the frame comprises a Frame Word, indicated at 10 followed by the interleaved data streams at 11, and also a control bit C. In this figure the Frame Word is bunched and is not distributed through the frame. The start of the next frame in the stream of data is shown by the next Frame Word at 10'. The two Frame Words, and all subsequent Frame Words will of course contain the same sequence of bits.

FIG. 1(b) shows the generalised Frame of FIG. 1(a) in slightly greater detail. It can be seen that the Frame Words 10, 10' consist of the bit sequence 1100. Also shown in this Figure is the way in which four separate data streams (A, B, C and D) are interleaved, with the first bits of the four streams filling the first four positions within the data carrying portion of the Frame, the second bits of the four streams occupying the next four positions and so on.

FIG. 1(c) shows a typical Frame in which the multiplexed data has such a configuration that there are three simulations of the Frame Word, that is the same sequence of four bits, 1100, appears three times in addition to the Frame Word. The appearance of such simulations is statistically inevitable.

Any equipment which has to receive and decode such a data stream relies on the detection of the Frame Word to accomplish the separation of the subsequent interleaved data streams. If this alignment is lost then the multiplexed data cannot be reassembled in its original multi-stream form. The correct detection of Frame Words, and the avoidance of acting on simulations of Frame Words is thus of considerable importance. However it is always possible that due to system variables, noise and other factors alignment may be lost. Specifications for TDM equipment always stress that the average time to regain alignment should be within a certain specified period or that there should be a particular confidence of achieving alignment within a specified period.

Figure 3A:
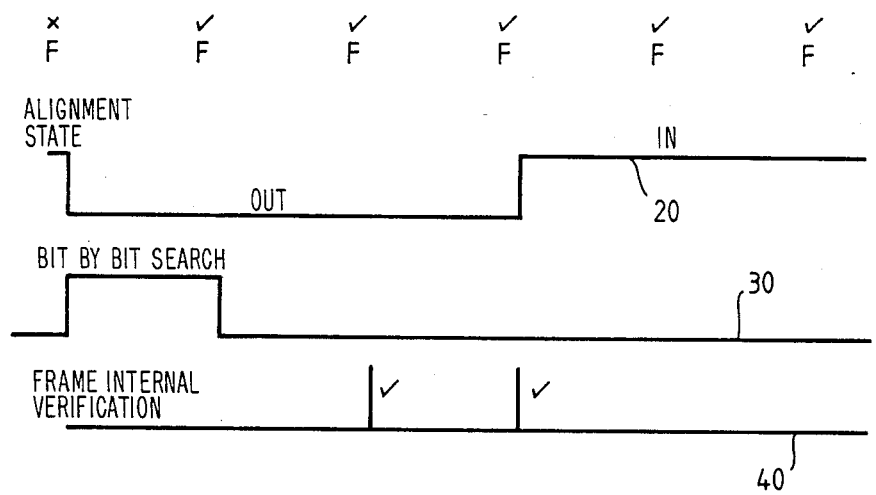
FIGS. 3(a) 3(b) show sequences which can occur when detecting an "in-alignment" condition.

Thus in order to ensure that a received TDM data stream is in alignment the receiving equipment checks at each expected time that the correct sequence of bits which make up a Frame Word is in fact present. FIG. 2 shows this. Because of the probability of transmission errors resulting in the Frame Word not being received, a single detection of "out-of-alignment" is not considered sufficient to indicate misalignment. Thus although a Frame Word is not detected at the expected time, the system still considers itself to be "in alignment" until a number of consecutive failures have been discovered. This number is 3 in the example given. Once this condition has been detected, for example when the Alignment State signal of FIG. 2 goes low, then an alignment process is initiated. Basically this process involves searching through the serial data at the receive terminal until a set of digits which correspond to the frame word are detected. In conventional TDM systems this bit-by-bit search is initiated as soon as the "out-of-alignment" condition has been detected. As soon as a set of digits corresponding to the Frame Word is detected the bit-by-bit search is aborted until exactly one Frame Period later. This is the sequence shown in FIG. 3(a) of the drawings. As before F indicates no Frame Word at the expected time, and F a correctly received Frame Word. Signal 20 goes high when the system is in alignment, Signal 30 goes high when the bit-by-bit search for alignment is going on, and the spikes in signal 40 show verification of alignment, or correct receipt of a Frame Word before the system returns to the "in-alignment" condition. FIG. 3(a) shows a simple case in which there were no simulations of the Frame Word detected before the system returned to alignment. Thus FIG. 3(a) shows firstly the detection of non-alignment, the start of a bit-by-bit search, the detection of a Frame Word, verification at subsequent Frame periods that a Frame Word is again present, and finally return to the aligned state.

Figure 3B:
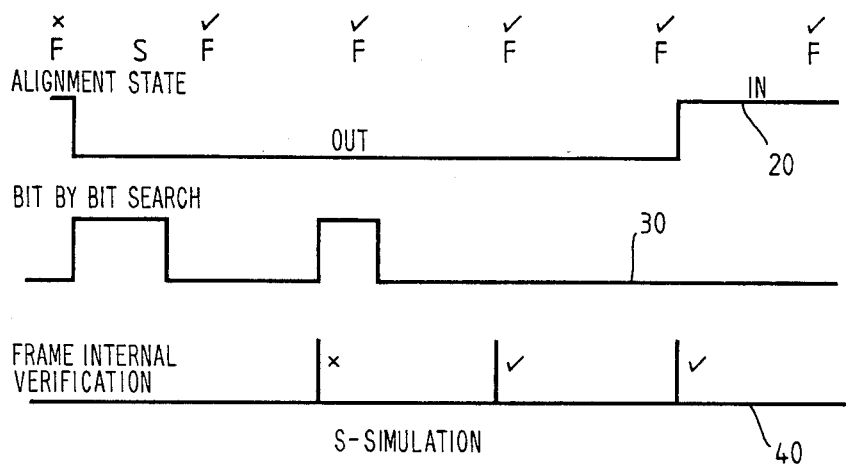

FIG. 3(b) shows, in the same format, what occurs when there is a simulation immediately after the out-of-alignment state has been detected. The simulation is shown at S. On detection of the simulation the bit-by-bit search (line 30) is aborted. The Frame interval verifier looks for the next Frame Word one frame later. This means that the correct Frame Word immediately following the simulation is bypassed. The verifier fails to find a Frame Word so the bit-by-bit search has to be restarted and it is the second correct Frame Word which is detected, rather than the first. Verification is now successful but the system has taken longer to achieve alignment.

The average time taken by the receive terminal to acquire alignment can be calculated. It is a function of the frame word length, the frame word interval and also the particular word chosen. In general terms the longer the frame word the less likely that it will be simulated. The less chance there is of a simulation then the less time will be spent in abortive frame interval searching and more time can be spent in productive bit-by-bit searching. As can be seen from the previous examples it is normal to commence the bit-by-bit search procedure at the earliest possible time. However as is apparent from FIG. 3(b) this procedure can lead to correctly positioned Frame Words being missed and accordingly the out-of-alignment condition being maintained for longer than really necessary.

The present invention proposes shortening the average time to recover alignment by actually delaying the start of the bit-by-bit search.

The justification of this requires an appreciation of the mechanisms by which a receive terminal normally loses alignment. In a working environment the digital traffic passes through a transmission medium comprising of regenerators and multiplexers. Digital errors can be introduced which result primarily in two effects at the receiving equipment. Firstly an error in the transmission medium can cause an error or series of errors in the received data. This error or error series may occur during the time in which the frame word is being transmitted. A single frame word received in error will not normally cause receive equipment to lose alignment. However if errors occured which caused a number of consecutive frame words to be received in error, then the receive equipment would initiate an alignment search.

The second method of causing frame alignment failure is usually associated with jitter build-up in a regenerated system or alternatively with justification failure in a multiplexing system. The result of this form of failure is to add or to omit a bit in the received information, hence causing a shift in the position of the Frame Word by one bit either positively or negatively. The receive equipment will then fail to recognise the Frame Word in the expected position and out-of-alignment will be flagged.

In the first of these two cases the transmit and receive terminals actually remained correctly synchronised, as the errors arose in the transmission medium. Thus by initiating the bit-by-bit search at a time equal to or before the expected arrival of the next Frame Word, the possibility of the system recognising simulated Frame Words can be eliminated or substantially reduced.

In the second of the two cases because the true Frame Word is occurring only one bit removed from its anticipated position, by initiating the bit-by-bit search at a time before the expected arrival of the next Frame Word, the possibility of simulations interfering with the realignment procedure is substantially reduced.

In the embodiment being described the bit-by-bit search is delayed for a period of one frame minus one bit after out-of-alignment has been detected.

Figure 3C:
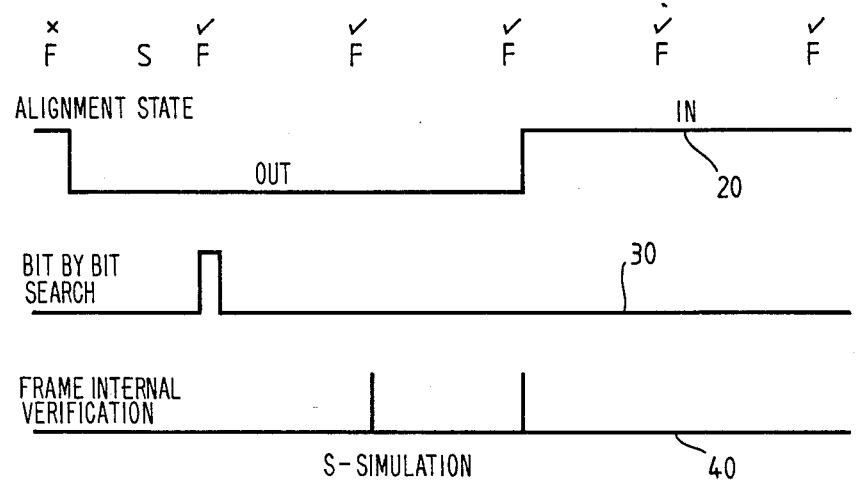
FIGS. 3(c) shows a single simulation with delay in a bit-by-bit search for alignment.

This is the situation illustrated in FIG. 3(c) in which the concept of the present invention is used to reduce re-alignment time.

In this Figure the simulation S is not recognised as a Frame Word as the bit-by-bit search had still to be initiated, that is S occurred less than a frame period minus one bit after out-of-alignment had been detected. By comparing FIG. 3(c) with FIG. 3(b) it will be seen that alignment was achieved a whole frame period earlier.

Figure 4:
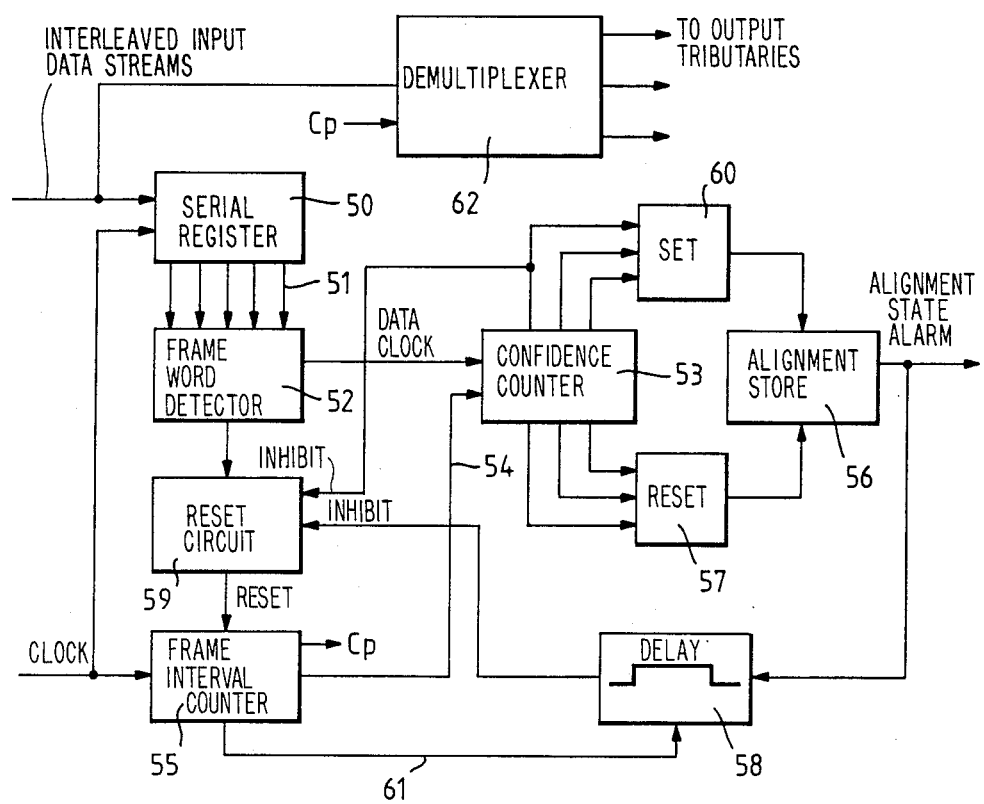
FIG. 4 is a block diagram showing a frame alignment detector according to the present invention.

Referring now to FIG. 4 of the drawings, this shows the realignment circuitry in a receive terminal according to an embodiment of the present invention. The TDM input data stream is fed into a serial register 50 whose length is at least equal to the length of a Frame Word. Parallel outputs 51 from register 50 feed a gate 52 which is configured to give outputs only when serial register 50 contains the bit sequence which forms the frame word. This sequence may of course either be a true Frame Word or a simulation. The output of gate 52 is fed to a confidence counter 53 which is clocked once per frame by clock pulses on line 54 from a Frame Interval Counter 55. The clock pulses are timed so that the counter 53 is clocked at the time when the Frame Word is expected to be present in Serial Register 50. If the Frame Word is received correctly then the Confidence Counter 53 fills with an all 1's state and a Master Alignment Store 56 is held in the "In Alignment" state. This aligned state inhibits reset pulses to the Frame Interval Counter 55 and the system stays aligned to the frame word sequence which is present at the input.

If the input data is subject to errors, and a Frame Word is not detected at the expected time then a 0 is entered into the confidence counter 53. The Master Alignment Store 56 maintains its "In Alignment" state until a predetermined number of Frame Words have been received in error or until some other out-of-alignment criterion has been reached. In the present embodiment the "Out-of-Alignment" state is considered to have been reached when the confidence counter 53 contains 3 0's, that is 3 consecutive Frame Words have not been detected at the expected time. The presence of 3 0's in the confidence counter 53 is detected by Reset circuit 57 which resets the Master Alignment Store 56 to the "Out-of-Alignment" state. This change of state is communicated to Delay Circuit 58 the output of which is connected to a Reset Circuit 59. The signal from the Master Alignment Store, delayed by Delay Circuit 58, causes the Frame Interval Counter 55 to be reset so as to enable subsequent Frame Words or simulations to be recognised.

The first word which is correctly recognised resets the Frame Interval Counter 55 and increments the state of the Confidence Counter 53 by one. This in turn inhibits further resets of the Frame.Interval Counter until either a false word is detected or an inhibit signal from the Master Alignment Store 56 indicates that alignment has been found again. However if the sequence of correctly received Frame Words does not last long enough to increment the Confidence Counter 53 to the necessary state for alignment then the inhibit is removed and a bit-by-bit search carried out until the next Frame Word or simulation is detected whereupon the process is repeated.

When the Confidence Counter 53 reaches the state of containing 3 1's this is detected by the Set circuit 60 which sets the Master Alignment Store into the "In Alignment" state.

In the embodiment being described the Delay Circuit 58 is arranged to introduce a delay of one Frame period minus one bit. Thus the bit-by-bit search for a Frame word will start almost one frame period after misalignment has been detected.

The Delay Circuit generates this delay by connecting clock pulses at the bit rate from the Frame Interval Counter 55. These pulses are supplied via line 61.

The Frame Interval Counter 55 also supplies clock pulses at its Cp output to a circuit indicated at 62 to enable the various interleaved data streams to be demultiplexed for transmission to the appropriate tributaries. As well as being connected to the Delay Circuit 58 the output of Master Alignment Store 56 can be used to give an alarm for the "Out-of-Alignment" state.

Whilst the Delay Circuit 58 has been stated as giving a delay of one frame period minus one bit, it will be appreciated that other delays are acceptable. In general, if the delay period is shortened, then the chances of simulations increase hence lengthening the frame alignment time, however, the frame word which has been chosen may eliminate the possibility of simulation within a block of bits immediately surrounding the true word. This allows the delay to be shortened by a restricted number of bits without detracting from the enhanced performance. A delay of exactly one frame will improve systems which are not subject to bit slips. Delays of greater than one frame are not considered to be beneficial.

We claim:

1. A terminal for receiving digital data in the form of a time multiplexed (TDM) data stream incorporating frames appearing at a predetermined frame period and each frame incorporating a frame word, the terminal comprising:
    (a) alignment detecting means including frame word detecting means for detecting the presence or absence of correctly aligned frame words and frame interval counter means for clocking said frame word detecting means once per frame;
    (b) reset means for resetting said frame interval counter means;
    (c) counting means operative for reaching a first predetermined state in response to said frame word detecting means indicating that a predetermined sequence of frame words has been correctly received;
    (d) master alignment circuit means held in an inalignment state when said counting means is in said first predetermined state;
    (e) means for setting said master alignment circuit means into an out-of-alignment state when said counting means changes to a second predetermined state in response to said frame word detecting means failing to detect a predetermined number of frame words in sequence;
    (f) search means for initiating a bit-by-bit search of the incoming data stream for the sequence of bits forming a frame word when an out-of-alignment condition has been detected and said master alignment circuit means is in said out-of-alignment state; and
    (g) delay means for delaying the start of said bit-by-bit search after an out-of-alignment state has been detected, said delay means being connected to said reset means.

2. A terminal as claimed in claim 1, wherein said frame word detecting means comprise a serial register for receiving said TDM data stream and having a length at least equal to the length of a frame word.

3. A terminal as claimed in claim 2, and including gating means for connecting said serial register to said counting means.

4. A terminal as claimed in claim 3, said frame interval counter means being operative to clock said counting means each time a frame word is expected in said serial register.

5. A terminal as claimed in claim 3, including means for altering the state of said counting means should a frame word not be present in said serial register at the expected time as determined by said frame interval counter means.

6. A terminal as claimed in claim 5, wherein said out-of-alignment state is determined by the failure to detect a selected number of frame words at appropriate times determined by said frame interval counter means.

7. A terminal as claimed in claim 6, wherein the delay means is connected to said frame interval counter means and is arranged to inhibit said counting means for a predetermined period.

8. A terminal as claimed in claim 7 wherein said delay means is operative to generate a delay of one frame period minus one bit.

* * * * *